United States Patent
Houlberg

(10) Patent No.: US 7,425,919 B2
(45) Date of Patent: Sep. 16, 2008

(54) RADAR VIDEO DATA VIEWER

(75) Inventor: Christian L. Houlberg, Ventura, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 112 days.

(21) Appl. No.: 11/713,831

(22) Filed: Feb. 14, 2007

(65) Prior Publication Data

US 2008/0191931 A1   Aug. 14, 2008

(51) Int. Cl.
G01S 7/04 (2006.01)

(52) U.S. Cl. .......................... 342/197; 342/62; 342/181

(58) Field of Classification Search .................. 342/62, 342/89–97, 197, 176–185
See application file for complete search history.

(56) References Cited

U.S. PATENT DOCUMENTS

| | | | | |
|---|---|---|---|---|
| 3,971,020 A | * | 7/1976 | Howard | 342/129 |
| 4,034,374 A | * | 7/1977 | Kruger | 342/155 |
| 4,649,390 A | * | 3/1987 | Andrews et al. | 342/140 |
| 6,281,833 B1 | * | 8/2001 | Pringle et al. | 342/95 |
| H002099 H | * | 4/2004 | Heydlauff et al. | 382/100 |
| 2007/0052582 A1 | * | 3/2007 | Houlberg et al. | 342/357.06 |

* cited by examiner

Primary Examiner—John B Sotomayor
(74) Attorney, Agent, or Firm—David S. Kalmbaugh

(57) ABSTRACT

A computer program which plots radar video data generated by a seeker on a missile. The program allows a user to plot multiple scans of radar video data on a chart, which is obtained from a Data Worksheet. The chart displays one or more sets of radar video data scans and a detection gate plot for each radar video data scan. The program includes Zoom In, Zoom Out, Pan Left and Pan Right functions which allow the user to view and manipulate views of the data displayed by the chart.

20 Claims, 13 Drawing Sheets

RADAR VIDEO DATA VIEWER

BACKGROUND OF THE INVENTION

1. Field of the Invention

The present invention relates generally to viewing radar video data. More particularly, the present invention relates to computer software which allows a viewer to view radar video data obtained from a missile seeker in graphical form with the radar video data depicting radar scans from the missile seeker.

2. Description of the Prior Art

Currently, there is a need to view radar video data obtained from a Harpoon missile seeker in a graphical form which depicts radar scans. The radar video data from the seeker is recorded on a BQM-34SH target test platform in encrypted format. The radar video data is then transferred to a personal computer (PC) for storage and decrypted utilizing a data decryption program in conjunction with electronic hardware connected to the PC. The encryption and decryption process is unique to the BQM-34SH recorded data.

There is also a need to view this radar video data using currently available standard office software found on most Windows operating system compatible PCs. This is desirable due to restrictions in the applications allowed to run on many Government computer networks, such as, the Navy Marine Corp Intranet (NMCI) network used by civilian and military employees of the Department of the Navy.

There is no technology currently available which can directly and conveniently allow a user to view Radar Video Data provided by the Harpoon missile seeker to the data decryption program noted above. The format of the decrypted data loaded by a radar video data viewer is unique to the data decryption program and is compatible for import into Microsoft's Excel spreadsheet program.

SUMMARY OF THE INVENTION

The present invention overcomes some of the difficulties of the past including those mentioned above in that it comprises a highly effective computer software for plotting multiple scans of radar video data on a chart and detection gate information for each scan of radar video data appearing on the chart. The data being plotted is from the seeker of a missile which is tracking a target. Target information appears within the detection gate information generated by the missile's seeker.

The radar video data for each scan and its associated detection gate information is loaded onto a Data Worksheet. The computer program then plots scans of radar video data from the Work Sheet and the detection gate with the user providing input to identify the scans of radar video data which the program plots on a chart. The chart appears on a computer monitor which allows a user to view the scans of radar video data and associated detection gates on the monitor.

The computer program is written for Microsoft Excel and includes Pan Left, Pan Right, Zoom In and Zoom Out functions which the user manipulates for multiple views of the radar video data and detection gate plots shown on the computer monitor. Control buttons are provided to allow the user to manipulate the Pan Left, Pan Right, Zoom In and Zoom Out functions.

The computer program provides for text labels, which display the first frame and scan counts and the last frame and scan counts contained in the radar video data on the data worksheet. The computer program also provides for text box controls which are used to display and set the first scan identified by the First Frame and First Scan text boxes. Additional text boxes allow the user to display and set the number of scans shown on the chart in a Scans Grouped text box, and to display an offset count of the first sample shown on the chart in a Samples Offset text box. The Samples Offset text box cannot be set by the user. The Samples Offset text box shows the first point displayed after a Zoom In occurs.

DETAILED DESCRIPTION OF A PREFERRED EMBODIMENT

Figure 1:
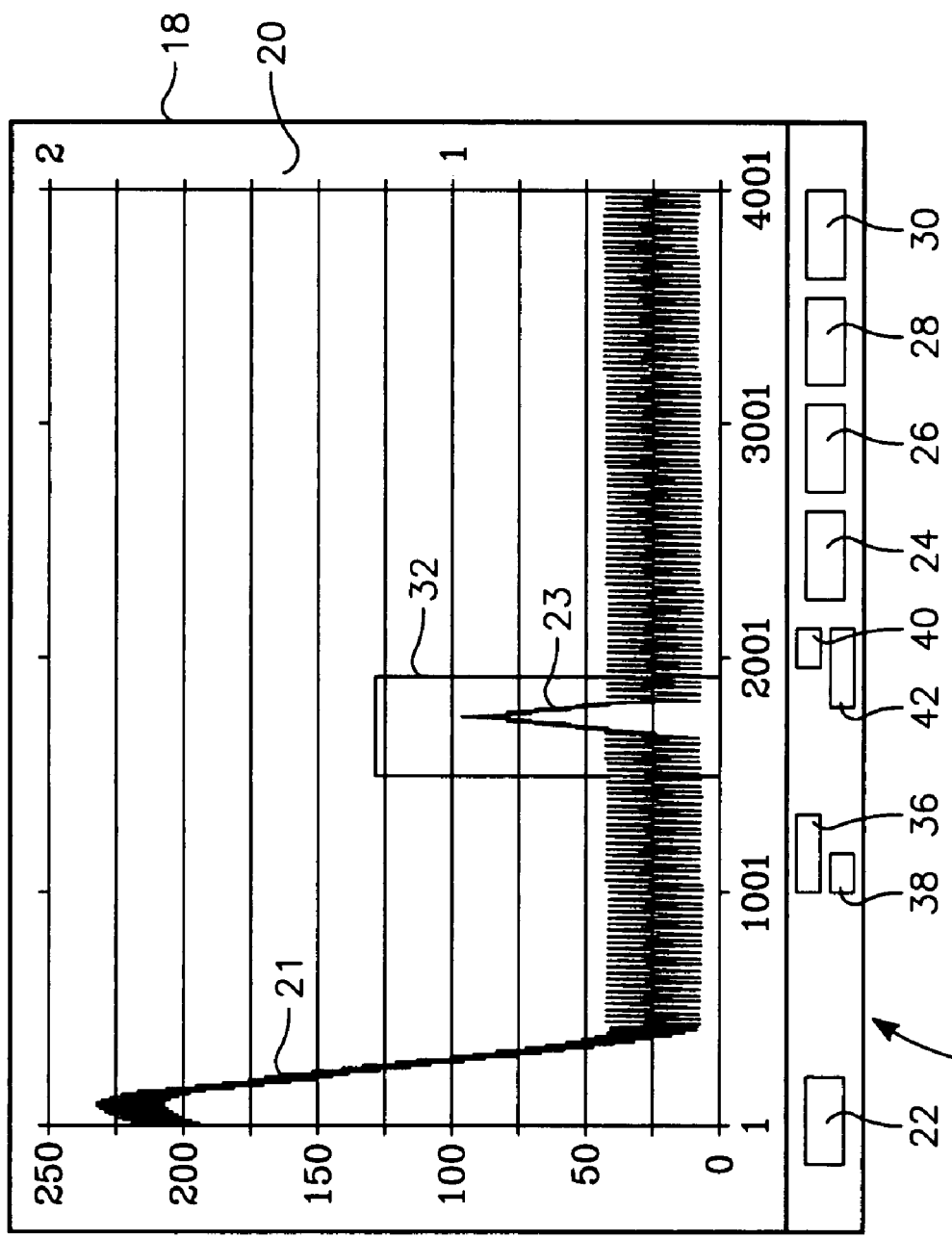
FIG. 1 is a view illustrating a plot worksheet of the radar video data as the data is shown on a computer video monitor for viewing by a viewer.

Referring to FIG. 1, there shown a plot of radar video data from the Harpoon missile seeker as the data appears on computer video monitor 18 for viewing by a viewer. The monitor 18 displays a chart 20 which includes control buttons, text labels and text box controls. Chart 20 is used to display one or more sets of radar video data scans 21 and a detection gate plot 32 for each radar video data scan 21.

As shown in FIG. 1 the monitor 18 displays five control buttons: (1) a New Data control button 22; (2) a Pan Left control button 24; (3) a Pan Right control button 26; (4) a Zoom In control button 28; and (5) a Zoom Out control button 30. The New Data control button 22 allows a user to load a new data file containing a series of radar scans with up to 2,048 radar scans. The Pan Left control button 24 allows a user to shift a view of the data to the left up to the first point comprising the radar scan. The Pan Right control button 26 allows a user to shift a view of the data to the right up to the last point comprising the radar scan. The Zoom In control button 28 magnifies the data within the view about the center of the display illustrated in FIG. 1 to show more detail of the display. The Zoom Out control button 30 expands the view of the display to show more of the radar video data scan.

The left vertical axis of the display of FIG. 1 is a count representing the amplitude of the video signal. The range of for the left vertical axis is 0 to 250. The right vertical axis represents the amplitude of the detection gate 32. The amplitude of the detection gate 32 is either a one or zero. The horizontal axis of the display of FIG. 1 represents the samples for a scan. The range for the horizontal axis is 0 to 4096, which represents the maximum number of samples in a scan.

At this time it should be noted that the 0, 1 levels for the detection gate 32 are generated by the Harpoon Missile's Radar Seeker. The detection gate 32 is a window which indicates the location of the target as determined by the Harpoon Missile's Radar Seeker. When the Harpoon Missile's Radar Seeker does not have the exact location for the target the gate 32 is wide. A wide detection gate indicates the general area where the Harpoon Missile's Radar Seeker is looking for the target. The gate narrows when the Seeker locates the target.

The text labels, represented generally by the reference numeral 34, display the first frame and scan counts and the last frame and scan counts contained in the radar video data on the data worksheet. The labels 34 are updated only when the viewer loads a new data file by using the New Data control button 22. The display of FIG. 1 displays radar video data from Frame 279, Scan 50 to Frame 280, Scan 50.

The text box controls are used to display and set the first scan identified by the First Frame and First Scan text boxes 36 and 38, respectively. The text box controls are also used to display and set the number of scans shown on the chart in the Scans Grouped text box 40, and to display the offset count of the first sample shown on the chart in the Samples Offset text box 42. The Samples Offset text box 42 cannot be set by the user. The Samples Offset text box 42 shows the first point displayed after a Zoom In occurs.

It should be noted that the scans shown are successive scans with the user identifying the first scan to be shown by entering numerical data for the scan to be shown in the First Frame and First Scan text boxes 36 and 38 and the number of successive scans to be shown in the Scans Grouped text box 40. For example, if two scans of radar video data are to be shown on graph 20 the user enters the number two in Scans Grouped text box 40.

The number in the Scans Grouped text box 40 has a range 1-31. The number in the First Frame text box 36 has a range of 0-4095. The number in the First Scan text box 38 has a range of approximately 0-63.

The large values at the beginning of the radio video data scan 21 displayed on chart 20 indicate where the master trigger of the radar burst and subsequent bleed over occurs. The radar burst is directed toward the target and the reflection from the target is represented by peek 23 displayed on chart 20.

The Data worksheet contains the radar video data comprising all of the scans viewable on the chart of FIG. 1. The format of the radar video data is as follows:

Data file format:
Sync,<frame sync>
Frame,<frame count>
Scan,<scan count>
Video,Gate
<video sample>,<gate sample>
<video sample>,<gate sample>
<video sample>,<gate sample>

The following illustrates the format for the video data in the Data Worksheet:

Data Worksheet Format

| A | B | C | D | ... | N | N<> |
|---|---|---|---|---|---|---|
| Frame | <frame#> | Frame | <frame#> | | Frame | <frame#> |
| Scan | <scan#> | Scan | <scan#> | | Scan | <scan#> |
| Video | Gate | Video | Gate | | Video | Gate |
| $<V_{00}>$ | $<G_{00}>$ | $<V_{10}>$ | $<G_{00}>$ | | $<V_{N0}>$ | $<G_{N0}>$ |
| $<V_{01}>$ | $<G_{01}>$ | $<V_{11}>$ | $<G_{11}>$ | | $<V_{N1}>$ | $<G_{N1}>$ |
| ... | ... | ..... | ... | | ... | ... |
| $<V_{0K}>$ | $<G_{0K}>$ | $<V_{1L}>$ | $<G_{1L}>$ | | $<V_{NM}>$ | $<G_{NM}>$ |

The number of scans per frame is approximately of 64. The number of samples per scan is no more than 4096. Excel limits the number of rows in each column of the Data Worksheet to 65,536. Excel also limits the number of columns in the Worksheet to 256. For each pair of columns, the data displayed is limited to sixteen scans. For each Data Worksheet the number of scans that can be displayed is limited to 2048. However, Excel also limits the number of points in a chart to 256,000 points. This limits the maximum number of scans which can be charted on the chart of FIG. 1 simultaneously to thirty one.

The data from the Harpoon Missile's Radar Seeker is input into a video telemeter on board the BQM-34SH target test platform. The video telemeter outputs data and a clock to a parallel data encryption unit which encryptes the data and then provides the encrypted data to a video recorder on board the BQM-34SH. When a test using the missile seeker is complete, the recorder's data is down loaded into a personal computer and then decrypted. The data can then be viewed on chart 20.

Figure 2:
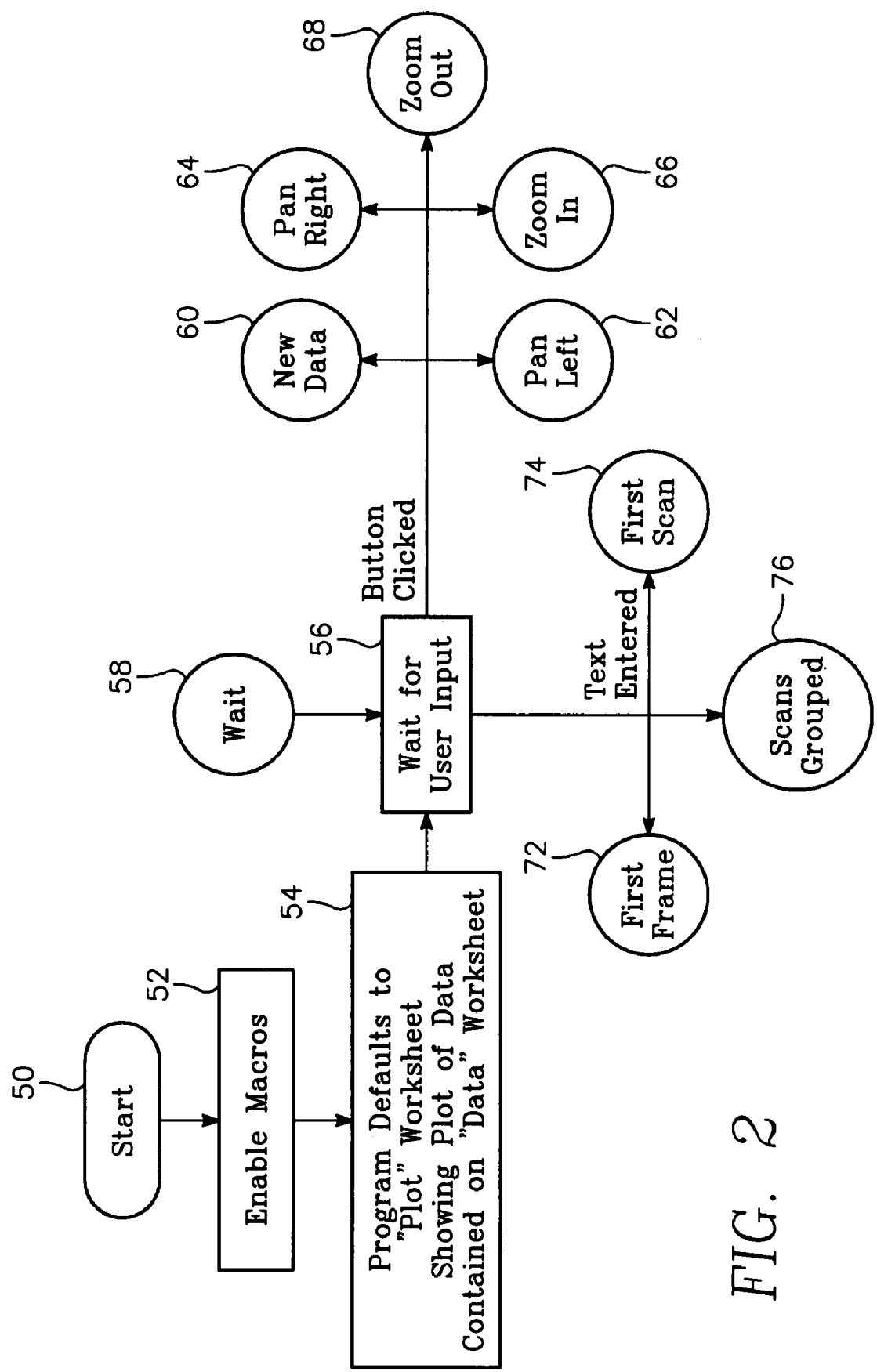
FIG. 2 is a flow chart for the Start routine of the computer program RadarVideoDataViewer.xls which allows the viewer to view the plot of radar video data.

Referring to FIGS. 1 and 2, FIG. 2 is a flow chart for the START routine of the computer program RadarVideoDataViewer.xls which allows the viewer to view the scan 21 of radar video data displayed on chart 20. Program step 50 begins the Start routine for the computer software program RadarVideoDataViewer.xls. Program step 52 enables Excel Macros within the software. In step 54 the program defaults to the plot worksheet which shows the scan 21 of radar video data currently in the data worksheet during program step 54. During program steps 56 and 58, the software waits for user input, which is generated by clicking buttons 22, 24, 26, 28 and 30 or entering values in text boxes 36, 38 and 40. Program step 60 starts the New Data routine. Program step 62 starts the Pan Left routine. Program step 64 starts the Pan Right routine. Program step 66 starts the Zoom In routine. Program step 68 starts the Zoom Out routine.

Figure 3:
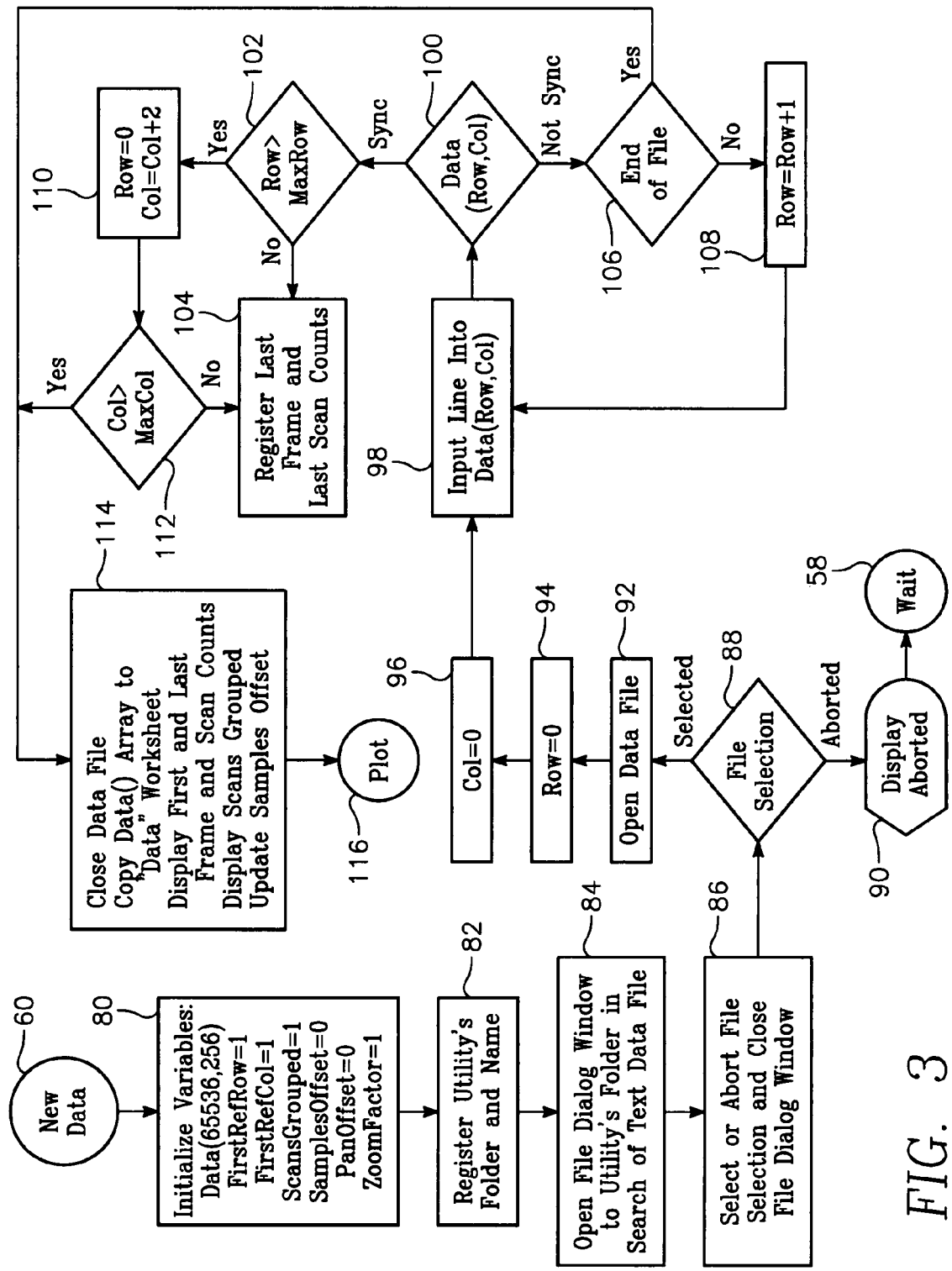
FIG. 3 is a flow chart for the New Data routine of the computer program RadarVideoDataViewer.xls.

Referring to FIGS. 1, 2 and 3, when the user clicks the new data button 22, the software executes the new data routine of FIG. 3. Program step 80 initializes variables. Program step 82 registers the Utility's Folder and name. During program step 84, the user opens the File Dialog Window to the Utility's Folder in search of the Text Data file.

During program step 86 the user selects a file for display on chart 20 which is in the form of the data file format. The user can abort the selection by clicking a cancel button on a file dialog window on the computer monitor 18 (program steps 88 and 90). A message is displayed on the monitor 18 indicating that the operation is being aborted. The File Selection program step 88 is a decision step which allows a user to select a file for display or abort the selection process.

Program step 92 opens the data file. The software initializes the row and column indices of a data array to zero that will contain the video data scans (steps 94 and 96). The software looks for a frame sync and then inputs a line of video data into a data array reserved in the memory of the PC (program step 98). The software then checks to determine if the data is a Sync (program step 100). The first item of data in the data-file is always a sync.

A check is then made to determine if the row exceeds the maximum number of rows allowed by the software (program step 102). This is the maximum number of rows allowed by Excel minus the maximum number of samples in a scan Excel allows for 65,536 rows in the worksheet. If the maximum number of rows allowed by the software is not exceeded then the software proceeds to program step 104. The frame count and scan count, which follow the sync, are loaded into the PC for tracking purposes during program step 104. The next line of video data, which is not a frame sync, is input into the data array and the row index is incremented (program step 108).

If the maximum number of rows allowed by the software is exceeded then the software proceeds to program step 110. The row index will then be set to zero and the column index incremented by two. A check is then made if the column exceeds the maximum number of columns allowed by Excel (program step 112) which allows for 256 in the worksheet. If the maximum number of columns is not exceeded the software program step 104 in the manner previously described. If the maximum number of columns is exceeded then the software proceeds to program step 114 where the data file is closed and the data is copied from the data array to the Data Worksheet.

The process of loading a line of data into the data array continues until the end of the file is reached (program step 106), the end of the Data Worksheet is reached (program step 112), or the end of a scan is reached.

When the end of a scan is reached, a frame sync will follow and a new scan of video data is loaded into the data array. When the end of the file is reached (program step 106) or the end of the Worksheet is reached (program step 112), the data file is closed and data is copied from the data array to the Data Worksheet (program step 114).

The data array significantly speeds up the process of loading data into the Worksheet by eliminating the need to load each line in the file into a pair of cells in the Worksheet directly. Loading the video data into an array allows the video data to be copied into the Worksheet in one step which significantly speeds up the loading process.

When the video data is completely loaded into the Worksheet the first and last frame and scan counts are displayed (program step 114). For the chart 20 illustrated in FIG. 1, he first frame is 279, the first scan is 50, the last frame is 280 and the last scan is 50. The Scans Grouped is displayed and Samples Offset is updated and then displayed. The software defaults to one and zero which are displayed in the Scans Grouped text box 40 and the Samples Offset text box 42, respectively, when new data is loaded into the Worksheet. The first frame value of 279 is displayed in the First Frame text box 36 and the first scan value of 50 is displayed in the First Scan text box 38.

Figure 4:
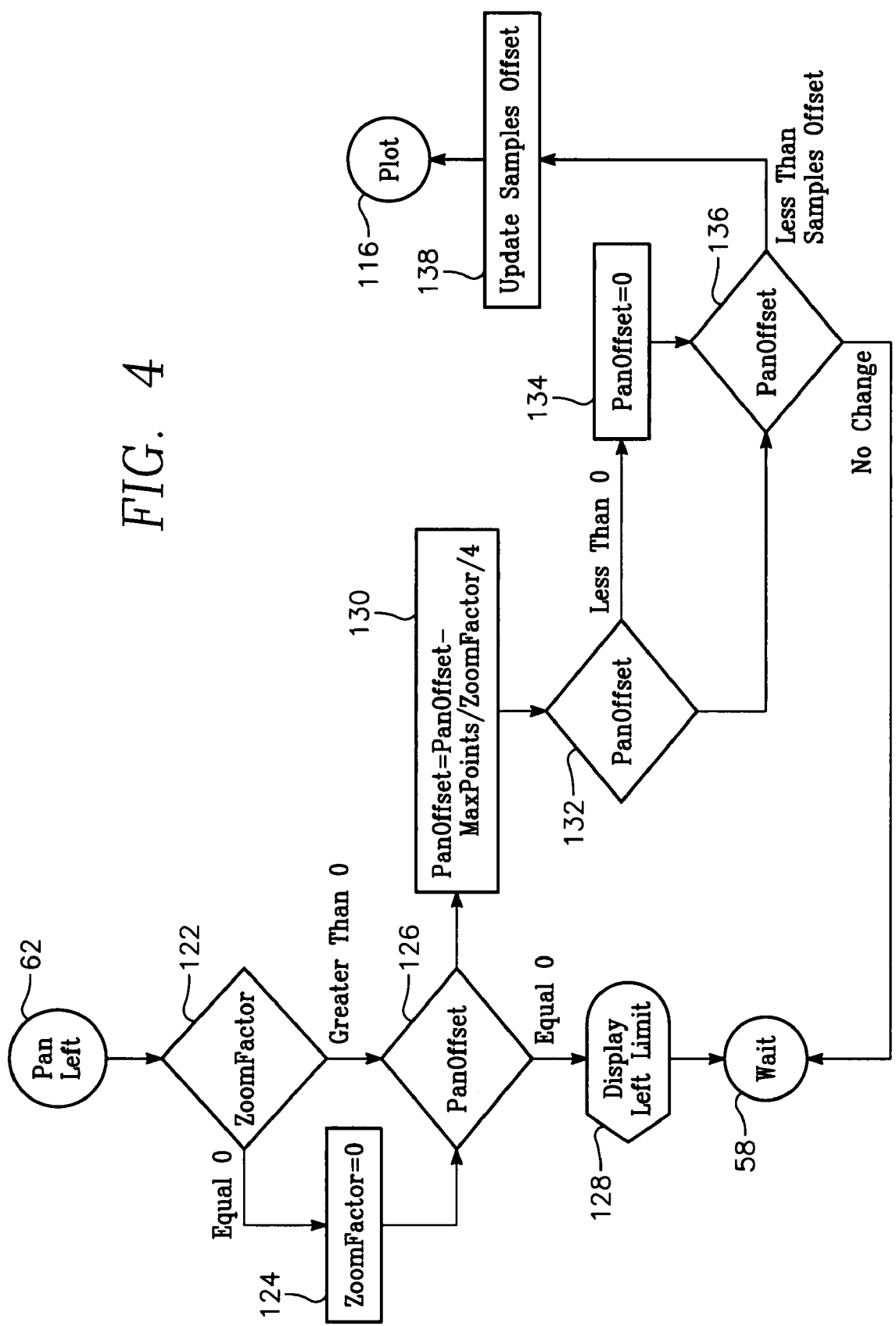
FIG. 4 is a flow chart for the Pan Left routine of the computer program RadarVideoDataViewer.xls.

Referring to FIGS. 1, 2 and 4, when the user clicks on the Pan Left control button 24 the software proceeds to the Pan Left routine 62 illustrated in FIG. 4. The software Macro checks the Zoom Factor during program step 122. When the Zoom Factor equals zero, which is an invalid value, the software sets the Zoom Factor to the default value of one (program step 124). When the Zoom Factor is greater than zero the software proceeds directly to program step 126 which is begins the PanOffset process. When the PanOffset is equal to zero the left limit message of the chart 20 is displayed (program step 128). Zero represents the first sample of video data depicted at the far left end of the radar video data scan 21 illustrated in FIG. 1. The software then exits the Pan Left routine and waits for another user input (program step 58).

When the PanOffset is not zero a new PanOffset is calculated during program step 130 in accordance with the following expression:

$$\text{PanOffset} = \text{PanOffset} - \text{MaxPoints}/\text{ZoomFactor}/4 \quad (1)$$

After the value for PanOffset is computed, a test is made to determine if the PanOffset is less than zero (program step 132). When the value of PanOffset is less than zero the value is set to zero (program step 134). MaxPoints is equal to 4096, which is the maximum number of samples per scan.

When the value of PanOffset is not less than zero a test is made to determine if there is a change in the value for PanOffset (program step 136). When the value of PanOffset does not change the software proceeds to program step 58 and waits for another input from the user. When a determination is made that the PanOffset is less than the Samples Offset (indicating movement to the left with respect to the chart 20 of FIG. 1), the Samples Offset text box 42 is updated and displayed to the user (program step 138). The software then proceeds to the plot routine 116 which re-plots the chart 20 including each scan 21 plotted on the chart 20.

Figure 5:
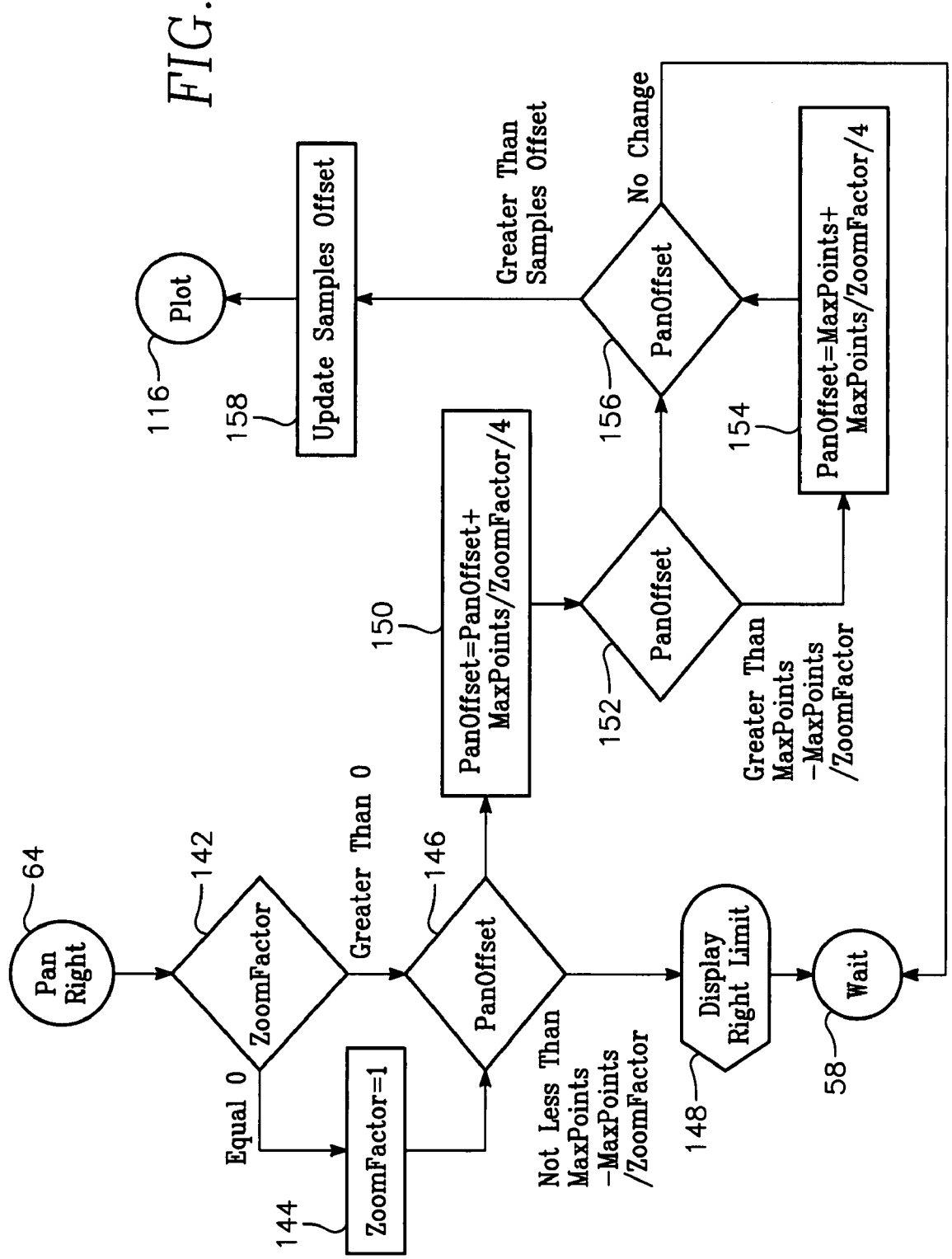
FIG. 5 is a flow chart for the Pan Right routine of the computer program RadarVideoDataViewer.xls.

Referring to FIGS. 1, 2 and 5, when the user clicks on the Pan Right control button 26 the software proceeds to the Pan Right routine 64 illustrated in FIG. 5. The software checks the Zoom Factor during program step 142. When the Zoom Factor equals zero, which is an invalid value, the software sets the Zoom Factor to the default value of one (program step 144). When the Zoom Factor is greater than zero the software proceeds to program step 146 which is a decision step. If the PanOffset is not less than the maximum number of points minus the maximum number of points divided by the Zoom Factor then the right limit message of chart 20 is displayed to the user (program step 148). The software then exits the Pan Right routine and waits for another user input (program step 58).

When the PanOffset has not reached the right limit of chart 20, a new PanOffset is calculated during program step 150 in accordance with the following expression:

$$\text{PanOffset} = \text{PanOffset} + \text{MaxPoints}/\text{ZoomFactor}/4 \quad (2)$$

After the new value for PanOffset is calculated, a test is made during program step 152 to determine if the value of PanOffset is greater than the maximum number of points minus the maximum number of points divided by the Zoom Factor the PanOffset is set in program step 154 to the value determined by the following expression:

$$\text{PanOffset} = \text{MaxPoints} + \text{MaxPoints}/\text{ZoomFactor}/4 \quad (2)$$

This expression is the far right limit for the value of PanOffset.

Program step 156 tests the value for PanOffset to determine if there is a change in the value for PanOffset (program step 156). When the value of PanOffset does not change the software proceeds to program step 58 and waits for another input from the user. When a determination is made that the PanOffset is greater than the Samples Offset, which is the previous value of PanOffset, (indicating movement to the right with respect to the chart 20 of FIG. 1), the Samples Offset text box 42 is updated and displayed to the user (program step 158).

The software then proceeds to the plot routine 116 which re-plots the chart 20 including each scan 21 plotted on the chart 20.

Figure 6:
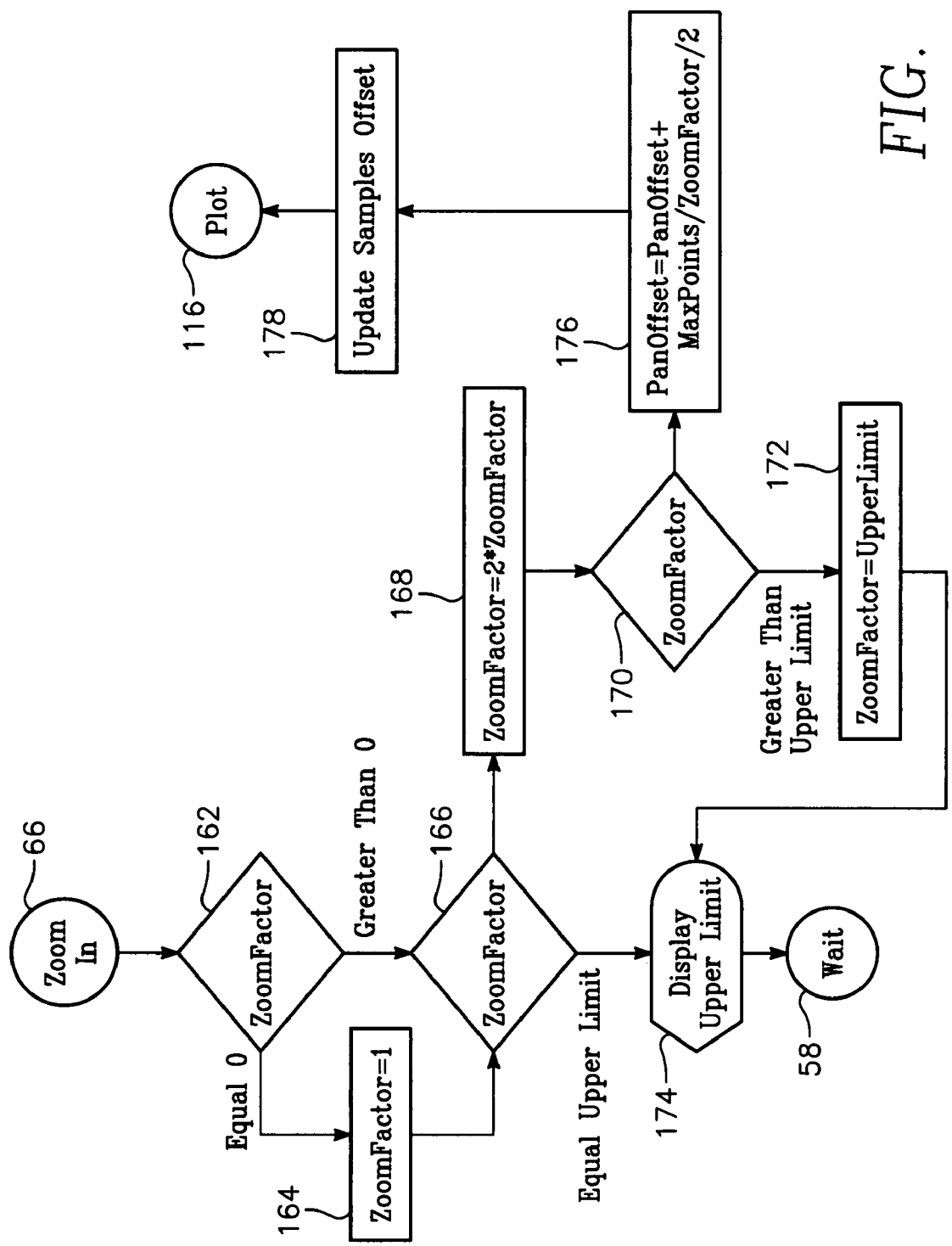
FIG. 6 is a flow chart for the Zoom In routine of the computer program RadarVideoDataViewer.xls.

Referring to FIGS. 1, 2 and 6, when the user clicks on the Zoom In control button 28, the software proceeds to the Zoom In routine 66. The software checks the Zoom Factor during program step 162. When the Zoom Factor equals zero, which is an invalid value, the software sets the Zoom Factor to the default value of one (program step 164). When the Zoom Factor is greater than zero the software proceeds to program step 166 which is a decision step. Program step 166 determines if the Zoom Factor is equal to its upper limit which is eight. The waveform is expanded by a factor of 256 when the Zoom Factor has reached its upper limit of eight.

If the Zoom Factor is not at the upper limit then program step 168 determines the Zoom Factor using the following expression:

$$\text{ZoomFactor} = 2 * \text{ZoomFactor} \tag{3}$$

Program step 170 tests the Zoom Factor to see if it is greater than the upper limit, and if it is greater than the upper limit the Zoom Factor is set equal to the upper limit (program step 172). Program step 174 displays a message on the computer monitor 18 that the Zoom Factor is at the upper limit.

If the Zoom Factor is not at the upper limit, the PanOffset is re-calculated (program step 176) using the following expression:

$$\text{PanOffset} = \text{PanOffset} - \text{MaxPoints}/\text{ZoomFactor}/2 \tag{4}$$

The PanOffset is recomputed to allow the program to zoom in at about the middle of current view on the display. The Samples Offset text box 42 is updated and displayed to the user (program step 178). The software then proceeds to the plot routine 116 which re-plots the chart 20 including each scan 21 plotted on the chart 20.

Figure 7:
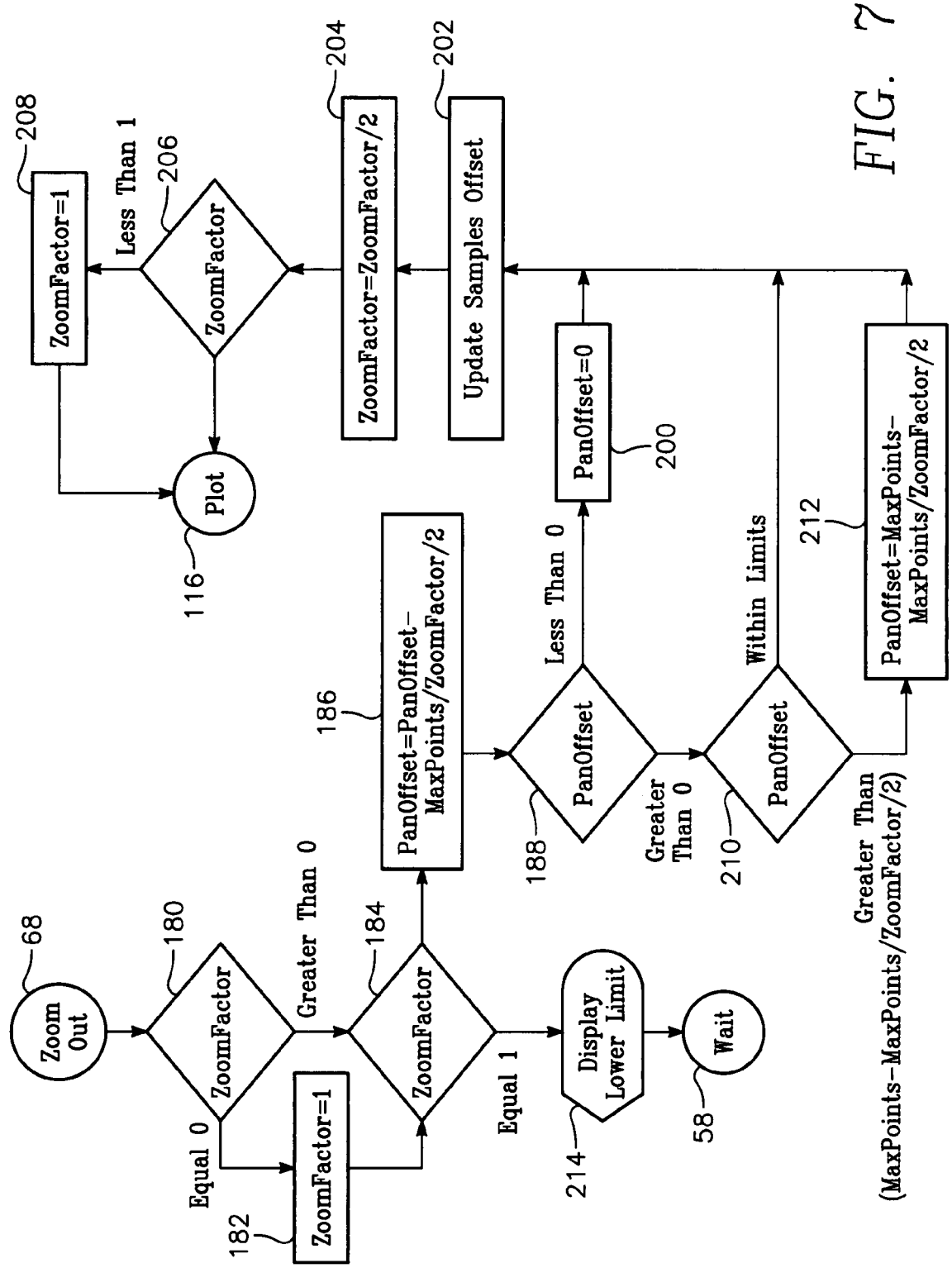
FIG. 7 is a flow chart for the Zoom Out routine of the computer program RadarVideoDataViewer.xls.

Referring to FIGS. 1, 2 and 7, when the user clicks the Zoom Out control button 30, the software proceeds to the Zoom Out routine 68 illustrated in FIG. 7. The software checks the Zoom Factor during program step 182. When the Zoom Factor equals zero, which is an invalid value, the software sets the Zoom Factor to the default value of one (program step 182). When the Zoom Factor is greater than zero the software proceeds to program step 184 which is a decision step.

When the Zoom Factor is equal to one (indicating the Zoom Out function is at the lower limit) the software displays to the user that the lower limit of Zoom Out has been reached (program step 214).

If the Zoom Factor is not equal to one, then the PanOffset is recalculated (program step 186) using the following expression:

$$\text{PanOffset} = \text{PanOffset} - \text{MaxPoints}/\text{ZoomFactor}/2 \tag{5}$$

For example, when the Zoom Factor is equal to two, then the PanOffset is recalculated using this expression. When the PanOffset is less than zero, the PanOffset is set equal to zero (program steps 188 and 200). The Samples Offset text box 42 is updated (program step 202) and the program step recalculates the Zoom Factor (program step 204) using the following expression:

$$\text{ZoomFactor} = \text{ZoomFactor}/2 \tag{6}$$

Program step 206 tests the Zoom Factor to determine if it is less than one. Program step 208 sets the Zoom Factor equal to one and then generates a plot (program step 116). If the Zoom Factor is not less than one, the software proceeds directly to program step 116 and generates a plot.

Referring again to program step 188, when the PanOffset is greater than zero, the software checks to see if the PanOffset is within limits (program step 210). If the PanOffset is within limits the software proceeds to program step 202 and updates the Samples Offset text box 42.

Program step 210 also checks to see if the PanOffset is greater then MaxPoints−MaxPoints/ZoomFactor/2. When the answer is yes then program step 212 recalculates the PanOffset using the following expression:

$$\text{PanOffset} = \text{MaxPoints} - \text{MaxPoints}/\text{ZoomFactor}/2 \tag{7}$$

This calculation represents the right limit of came chart 20.

Figure 8:
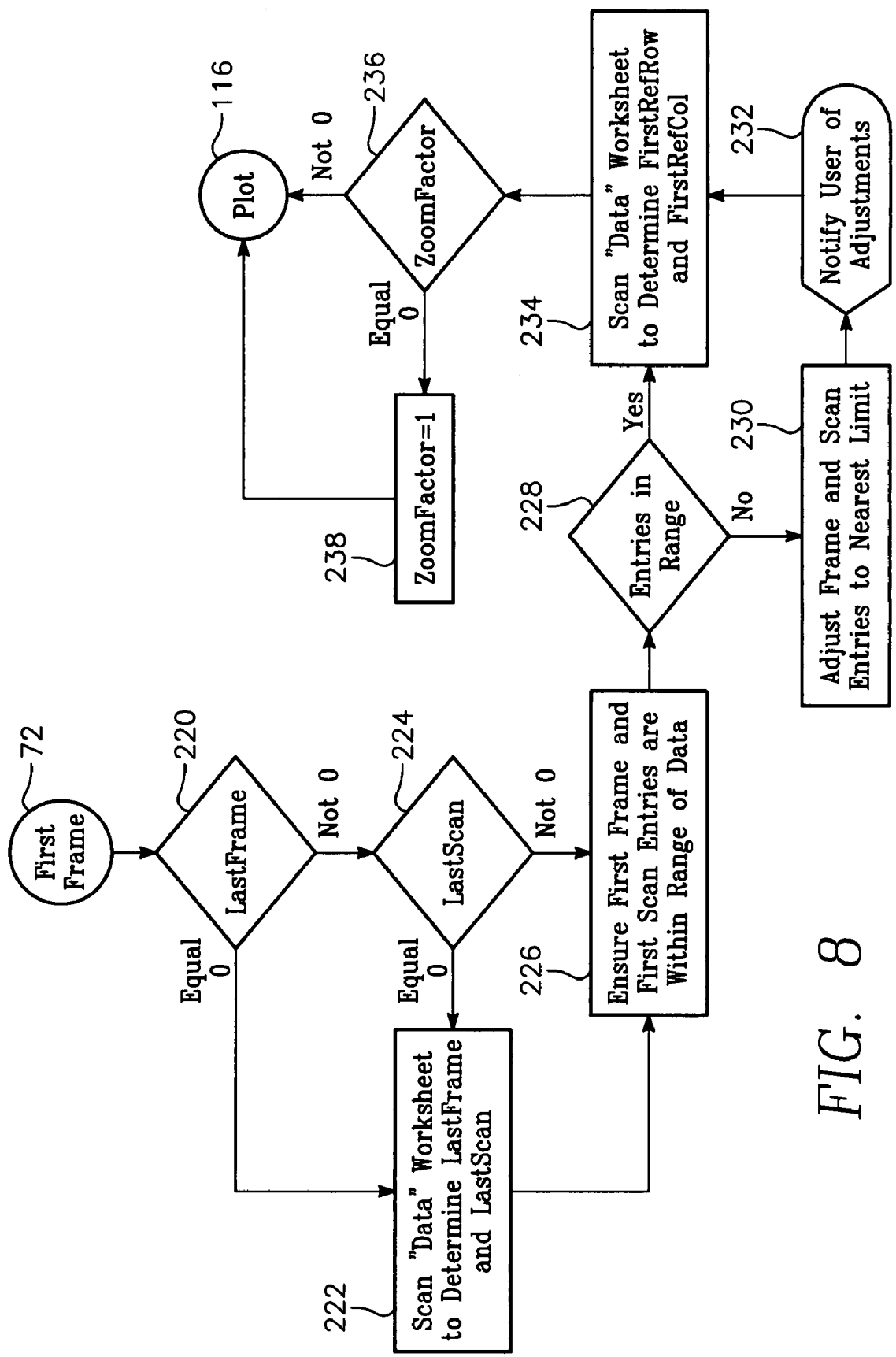
FIG. 8 is a flow chart for the First Frame routine of the computer program RadarVideoDataViewer.xls.

Referring to FIGS. 1, 2 and 8, the first frame routine 72 is a text entry routine. The first frame routine is used to enter a new frame number into the First Frame text box 36. The enter key or the tab key on a keyboard allows a user to process the entry in the First Frame text box 36. Releasing the enter or tab key calls the first frame subroutine 72.

Program step 220 checks to see if the last frame is equal to zero. If the last frame is equal to zero then the software proceeds to program step 222. Program step 222 scans the Data Worksheet to determine the actual last frame number and last scan number on the Data Worksheet. This scan of the Data Worksheet is required since the last frame number cannot be zero.

Program step 220 also checks to see if the last frame number is not zero and thus a valid number. When the last frame number is a valid number then the software proceeds to program step 224.

Program step 224 checks to see if the last scan is equal to zero. If the last scan is equal to zero, the software again proceeds to program step 222. Program step 222 scans the Data Worksheet to determine the actual last frame and last scan numbers on the Data Worksheet. This scan of the Data Worksheet is required since the last scan number cannot be zero.

Program step 224 also checks to see if the last scan number is not zero and thus a valid number. When the last scan number is a valid number then the software proceeds to program step 226.

Program steps 226 and 228 ensure that the first frame and first scan entries in the First Frame text box 36 and the First Scan text box 38 are within range of the data on the Data Worksheet. The Last Frame and Last Scan were checked to prevent the entry of first frame and first scan numbers which are beyond the range of the data entered into the Data Worksheet. If the answer to the decision made in program step 228 is "No" then the frame and scan entries in text boxes 36 and 38 are adjusted to their nearest limit on the Date Worksheet (program step 230). A pop up window appears on the monitor 18 notifying the user of the adjustment (program step 232). If the answer with respect to the decision made in program step 228 is "Yes" then the software proceeds to program step 234.

Program step 234 scans the Data Worksheet to determine the First Reference Row (FirstRefRow) and the First Reference Column (FirstRefCol). When the scan being plotted using data from the Data Worksheet is the first scan, the First Reference Row and First Reference Column are each one. Program step 236 checks the Zoom Factor and if the Zoom Factor is zero the software sets the Zoom Factor to one (program step 238) and proceeds to the Plot routine (program step 116). If the Zoom Factor is not zero the software proceeds directly to the Plot routine (program step 116).

Figure 9:
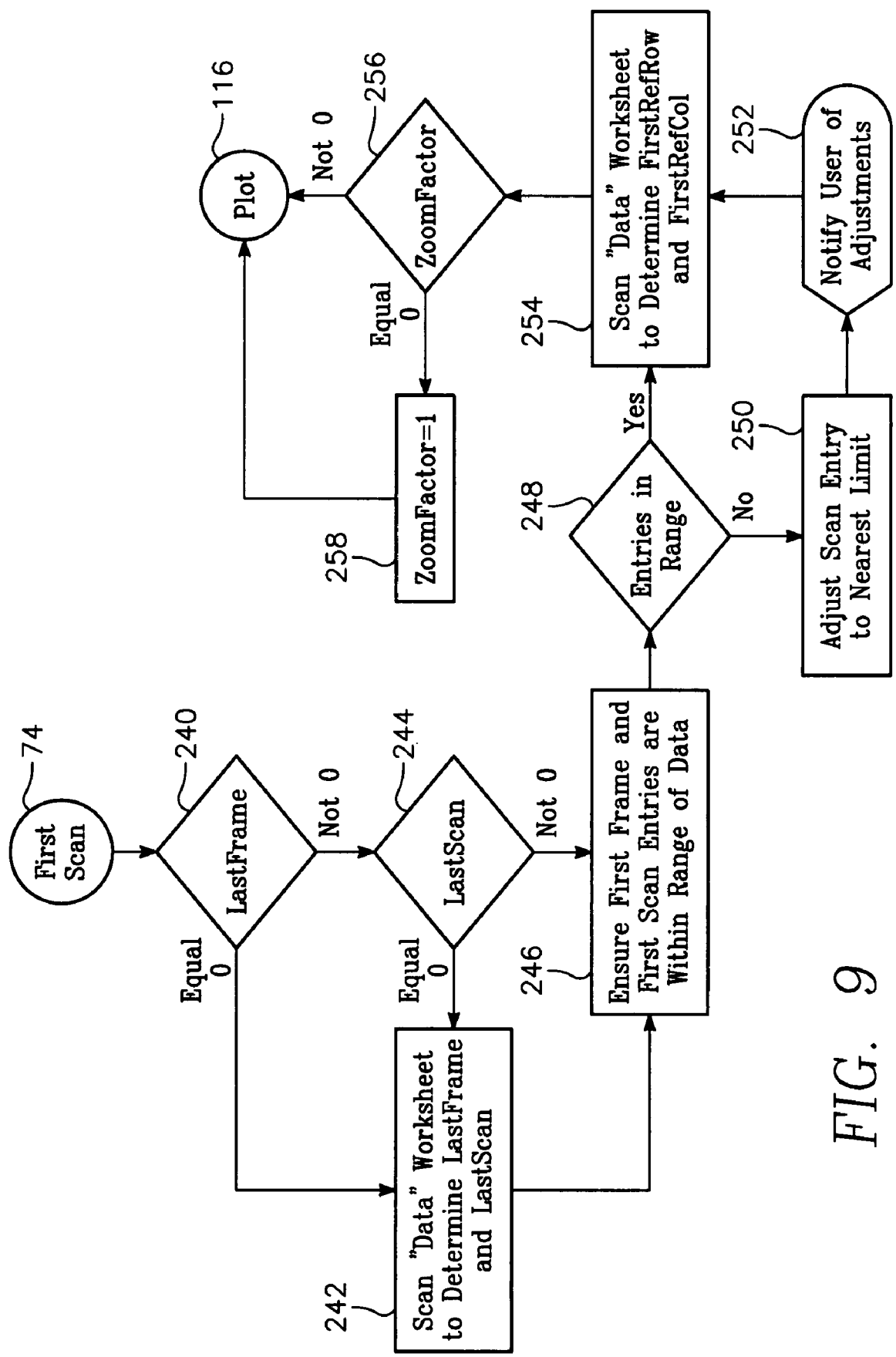
FIG. 9 is a flow chart for the First Scan routine of the computer program RadarVideoDataViewer.xls.
Figure 12:
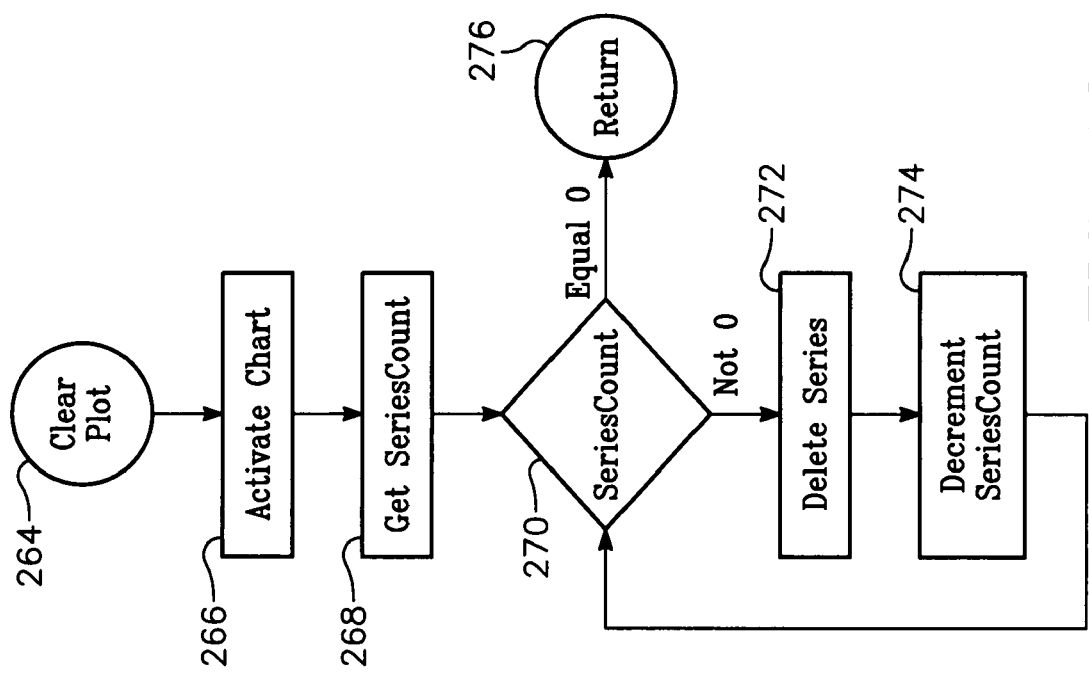
FIG. 12 is a flow chart for the Clear Plot routine of the computer program RadarVideoDataViewer.xls.

Referring to FIGS. 1, 2 and 9, the first scan routine 74 is a text entry routine. The first scan routine is used to enter a new scan number into the First Scan text box 38. The enter key or the tab key on a keyboard allows a user to process the entry in the First Scan text box 38. Releasing the enter or tab key calls the first scan subroutine 74.

Program step 240 checks to see if the last frame is equal to zero. If the last frame is equal to zero then the software proceeds to program step 242. Program step 242 scans the Data Worksheet to determine the actual last frame number and last scan number on the Data Worksheet. This scan of the Data Worksheet is required since the last frame number cannot be zero.

Program step 240 also checks to see if the last frame number is not zero and thus a valid number. When the last frame number is a valid number then the software proceeds to program step 244.

Program step 244 checks to see if the last scan is equal to zero. If the last scan is equal to zero, the software again proceeds to program step 242. Program step 242 scans the Data Worksheet to determine the actual last frame and last scan numbers on the Data Worksheet. This scan of the Data Worksheet is required since the last scan number cannot be zero.

Program step 244 also checks to see if the last scan number is not zero and thus a valid number. When the last scan number is a valid number then the software proceeds to program step 246.

Program steps 246 and 248 ensure that the first frame and first scan entries in the First Frame text box 36 and the First Scan text box 38 are within range of the data on the Data Worksheet. The Last Frame and Last Scan were checked to prevent the entry of first frame and first scan numbers which are beyond the range of the data entered into the Data Worksheet. If the answer to the decision made in program step 248 is "No" then the scan entry in text box 38 is adjusted to its nearest limit on the Date Worksheet (program step 250). A pop up window appears on the monitor 18 notifying the user of the adjustment (program step 252). If the answer with respect to the decision made in program step 248 is "Yes" then the software proceeds to program step 254.

Program step 254 scans the Data Worksheet to determine the First Reference Row (FirstRefRow) and the First Reference Column (FirstRefCol). When the scan being plotted using data from the Data Worksheet is the first scan, the First Reference Row and First Reference Column are each one. Program step 256 checks the Zoom Factor and if the Zoom Factor is zero the software sets the Zoom Factor to one (program step 258) and proceeds to the Plot routine (program step 116). If the Zoom Factor is not zero the software proceeds directly to the Plot routine (program step 116).

Figure 10:
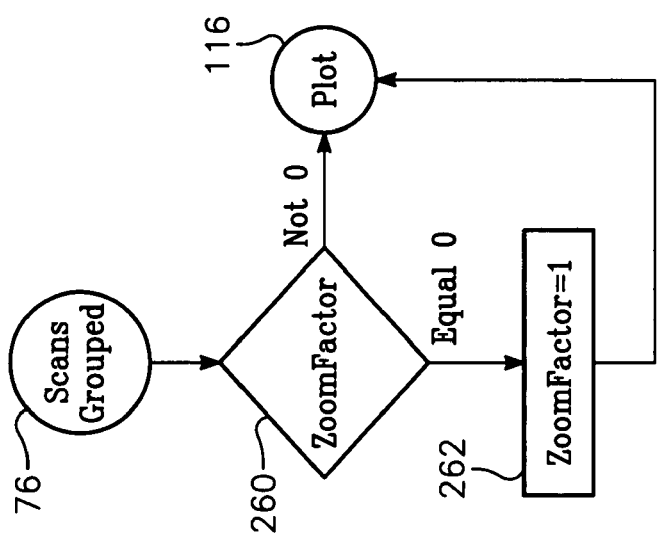
FIG. 10 is a flow chart for the Scans Grouped routine of the computer program RadarVideoDataViewer.xls.

Referring to FIGS. 1, 2 and 10, the Scans Grouped routine 76 checks the Zoom Factor during program step 260. If the Zoom Factor is zero, program step 262 sets the Zoom Factor equal to one and the software proceeds to the plot routine (program step 116). If the Zoom Factor is not zero, the software proceeds to program step 116 which is the plot routine.

Referring to FIGS. 1, 2, 11 and 12, the Plot Routine plots the radar video data from the Data Worksheet for the scans selected by the user onto chart 20. The software proceeds to clear the plot of old data by entering the Clear Plot routine 264 illustrated in FIG. 12. Chart 20 is activated during program step 266. Program step 268 gets the series count. The series count relates to each of the two plots on chart 20, which are the radar video data scan 21 and the detection gate plot 32. When there is only one scan group displayed on chart 20, there are two series being displayed: the radar video data and the detection gate. This results in the series count having a value of two. When two scans are displayed on chart 20 the series count is four. The series count is required to delete each of the data series which are displayed on chart 20. Each series count must be deleted separately.

Program step 270 is a decision block. When the Series count is not zero, a series is deleted (program step 272) and the series count is decremented (program step 274). This process continues until each series or plot on chart 20 has been deleted from chart 20. The software 276 then returns to the Plot routine of FIG. 11.

Program step 278 determines if the first reference row is zero. If the first reference row has a value of zero the software scans the Data Worksheet to determine the actual First Reference Row and the First Reference Column (program step 282). The First Reference Row and First Reference Column cannot have values of zero.

The First Reference Row contains frame information. The Second Reference Row contains scan information. The First Reference Column and Row cell contains a frame label and the Second Reference Column and First Reference Row contains the frame number.

After determining the First Reference Row and First Reference Column in the Data Worksheet, the software proceeds from program step 282 to program step 284. The software also proceeds from program 280 directly to program step 284 when the First Reference Row and First Reference Column in the Data Worksheet are not zero.

Program step 284 sets up a pair of temporary variables identified as RefRow and RefCol. Initially, RefRow and RefCol are set equal to First Reference Row and First Reference Column. This allows the software to remember the starting point for a plot of radar video data. RefRow and RefCol are manipulated when the viewer uses the Zoom In and Zoom Out functions by clicking on the Zoom In control button 28 and the Zoom Out control button 30. In addition, RefRow and RefCol are manipulated when the viewer uses the Pan Left and Pan Right functions by clicking the Pan Left control button 24 and the Pan Right control button 26. The variables RefRow and RefCol are used during a video data plot on chart 20.

The Color Array for chart 20 is also initialized during program step 284. Program step 286 again activates chart 20. Program step 288 sets the Point Count to zero, while program step 290 set the Scan equal to zero.

Figure 13:
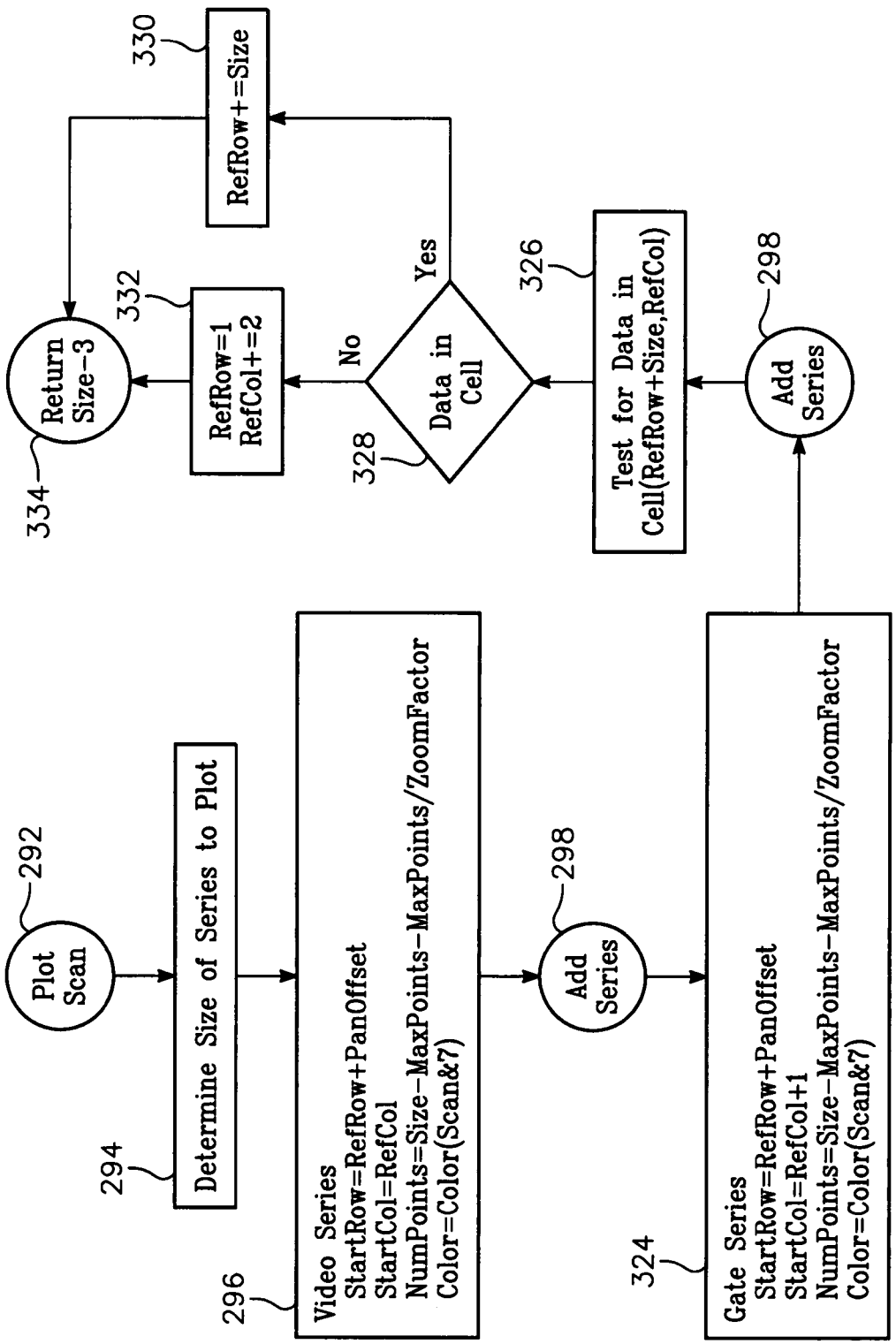
FIG. 13 is a flow chart for the Plot Scan routine of the computer program RadarVideoDataViewer.xls.

Referring to FIGS. 1, 2, 11, 13 and 14, program step 292 calls the Plot Scan routine of FIG. 13. The Plot Scan routine determines the size of radar video data points to plot (program step 294). The size is generally around 4096 data points but the size can vary from approximately 4000 to 4096. For the Video Series plot, which is scan 21 on chart 20, the Start Row and Start Column are calculated using the following expressions:

$$StartRow = RefRow + PanOffset \qquad (8)$$

$$StartCol = RefCol \qquad (9)$$

The number of data points is calculated using the following expression:

$$NumPoints = Size - MaxPoints - MaxPoints/ZoomFactor \qquad (10)$$

The color is also established from the eight colors which are available. If only one video data scan and one detection gate scan are plotted on chart the color appearing on chart 20 is the first available color. The colors are in order black, blue, green, cyan, red, magenta, brown and orange.

Figure 14:
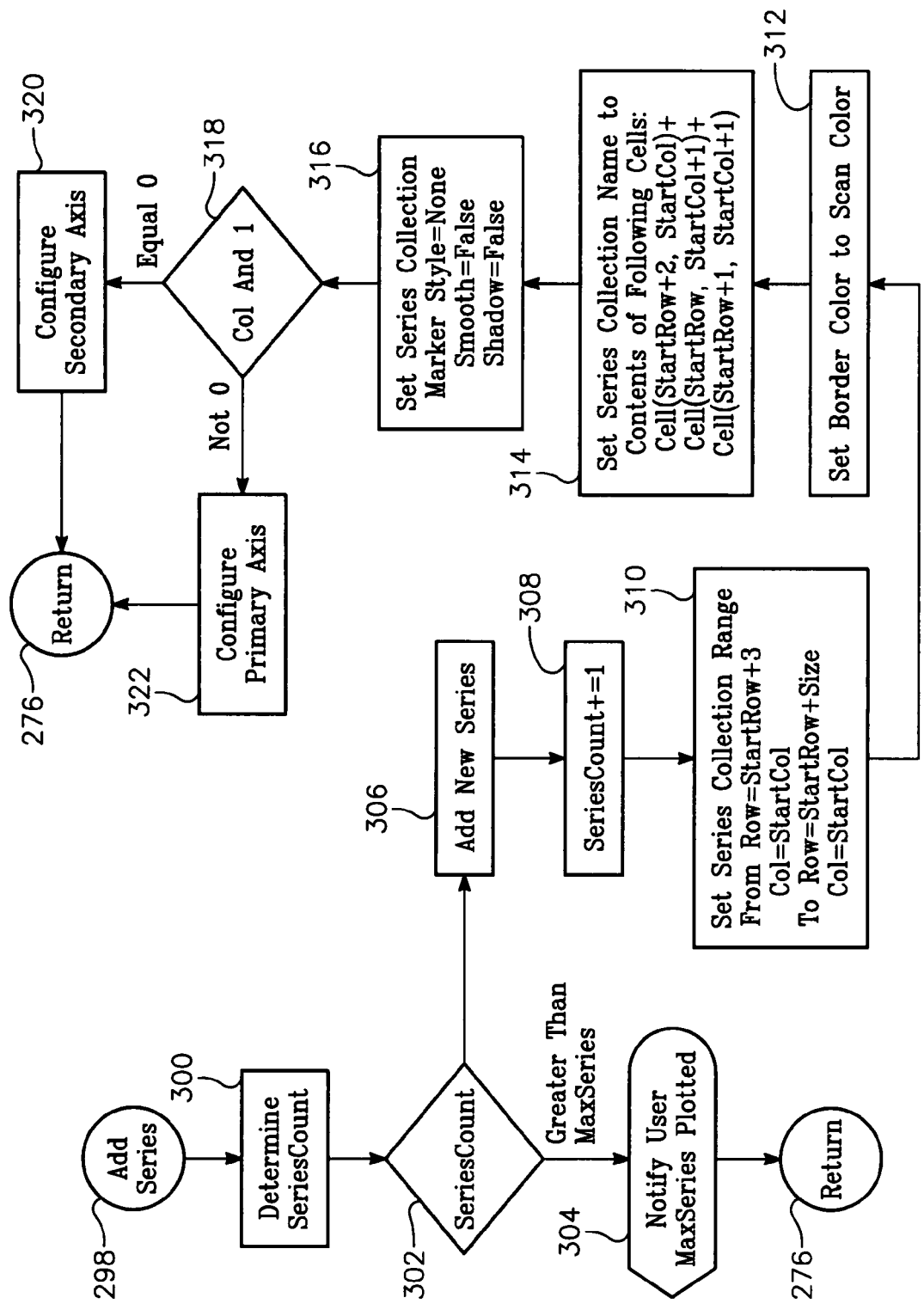
FIG. 14 is a flow chart for the Add Series routine of the computer program RadarVideoDataViewer.xls.

Program step 298 calls the Add Series routine of FIG. 14, which adds the scan data to chart 20. Program step 300 determines the Series Count which is the count of the series to be plotted on chart. Program step 302 is a decision block which determines if the Series Count is greater than the maximum number of series permitted on chart 20. If it is then program step 394 notifies the user that maximum number of series or plots allowed on chart 20 have been exceeded. The value for maximum series for the chart 20 is 31.

The software proceeds to program step 306 when the Series Count has not been exceed adding a new series of radar video data 21 to chart 20 and incrementing the count by plus one (program step 308). It should be noted gate detection plot 32 is added in exactly the same manner using the Add Series routine of FIG. 14.

Program step 310 sets a Series Collection Range for a scan from Row which equals StartRow plus three and column which equals StartCol to Row which equals StartRow plus size and column which equals StartCol. The first three rows of a scan include the frame count, scan count and video and data labels which necessitates the plus three added to StartRow to access the video data. The Size is determined by the number of points which are displayed on chart 20 for a particular scan. The Size for a scan in terms of the number of points comprising the scan plot is smaller when the viewer uses the Zoom In function.

Program step 312 sets the border color to the scan color. The border color is the color used to generate the line connecting the video data points of scan 21. The Series Collection Name is set during program step 314. The name consist of the frame count and scan count which the user can access by placing a mouse pointer on the radar video points comprising scan 21.

The name for the plot illustrated in FIG. 1 appears in a window as follows to the viewer: series "video 279 50". The X-axis and Y-axis values are also provided for viewing by the user. For example, the x-axis value may be 152 for a particular point on scan 21 with a corresponding Y-axis value of 128. The first three rows of the scan contain the frame count, the scan count and the labels "video" and "gate".

Program step 316 sets the Series Collection Marker Style to none which eliminates markers from the plot. The plot is set to be not smooth and there is no shadow specified for the plot.

Program step 318, which is a decision block, takes the column number and performs a logical AND with one to determine whether the user is looking at the first column or the second column of a pair of scan data columns on the Data Worksheet. If the result is zero than the column is the second column and the column contains detection gate data. The software proceeds to program step 320 which configures the Secondary Axis which is the detection gate axis on the right side of chart 20. If the result is not zero, the software proceeds to program step 322 configuring the primary Y-axis on the left side of the chart.

The software returns to the Plot Scan routine 292 of FIG. 13. Program step 324 calculates the StartRow, StartCol, NumPoints and Color parameters for the Gate Series using the following expressions:

$$\text{StartRow} = \text{RefRow} + \text{PanOffset} \tag{11}$$

$$\text{StartCol} = \text{RefCol} + 1 \tag{12}$$

$$\text{NumPoints} = \text{Size} - \text{MaxPoints} - \text{MaxPoints}/\text{ZoomFactor} \tag{13}$$

$$\text{Color} = \text{Color}(\text{Scan \& 7}) \tag{14}$$

The Add Series routine 298 is next called to add the Gate series to chart.

Program step 326 tests for data in Cell(RefRow+Size, RefCol). The test determines if there is additional data below the current plot of a series on chart 20. If there is additional data then there is the possibility for a plot of another series within the same column on the Data Worksheet (program steps 328 and 330). In this case RefRow is increased by size, which is the number of points just plotted. If there is additional data in the same column of the Data Worksheet a pointer is moved to the additional data and data is plotted If there is no additional data in the current cell then a new plot of a series of radar video data or detection gate data will begin with the next pair of columns in the Data Worksheet (program steps 328 and 332). In this case RefRow equals one and RefCol is increased by two, which results in the next scan to be plotted being contained in the next two columns on the Data Worksheet.

Program step 334 returns with a value of size minus three which tracks the actual number of points plotted on chart 20, not the number of point represented by series information.

Figure 11:
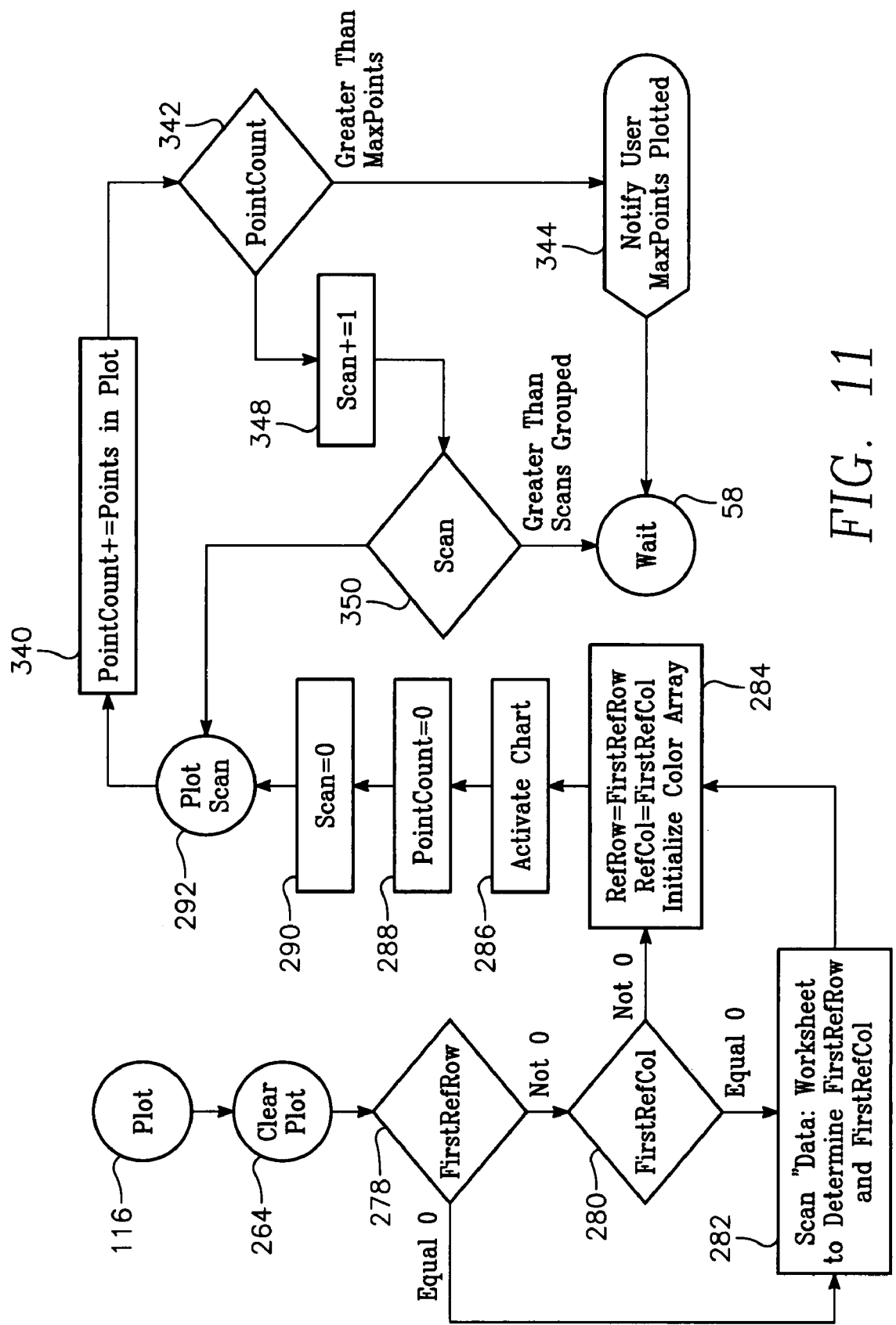
FIG. 11 is a flow chart for the Plot routine of the computer program RadarVideoDataViewer.xls.

Referring to FIGS. 1, 2 and 11, the software returns to the Plot routine 116 of FIG. 11. Program step 340 keeps track of the number of points plotted on chart 20. This prevents the user from exceeding the number of points which can be plotted using Excel. The maximum number of points which can be plotted on an Excel chart is 256,000. Program step 342 is a decision block. When the maximum number of points plotted exceeds 256,000 the user is notified that the maximum number of points have been plotted (program step 344).

When the point count is not greater than the maximum number of points allowed then the scan count is incremented by plus one (program step 348). Program step 350 is a decision block. When the variable Scan is greater than Scans Grouped (text box 40) then the software proceeds to program step 58 waiting for user input and the plot 21 is complete. When the variable Scan is not greater than Scans Grouped, the software proceeds to the plot Scan routine 292 of FIG. 13 and plots another scan on chart 20.

What is claimed is:

1. A radar video data viewing system comprising:
(a) a monitor for viewing a scan of radar video data provided by a radar seeker for a missile, wherein the scan of radar video data appears on a graph displayed on said monitor, said graph including:
(i) a horizontal axis having a numerical range of approximately 0 to 4096, said horizontal axis representing a numerical range of radar video data points for said scan of radar video data being plotted on said graph;
(ii) a first vertical axis positioned on the left end of said graph, said first vertical axis indicating an amplitude for each of said radar video data points being plotted on said graph;
(iii) a second vertical axis positioned on the right end of said graph, said second vertical axis indicating an amplitude for detection gate data appearing on said graph, wherein said detection gate data comprises a detection gate window plotted on said graph which indicates a location for a target within said radar video data points as determined by the radar seeker for said missile;
(b) a plurality of control buttons appearing on said monitor below said graph, said plurality of control buttons allowing a user to manipulate views of the scan of radar video data and the detection gate window plotted on said graph;

(c) a plurality of text box controls appearing on said monitor below said graph, said plurality of text box controls allowing a user to select the scan of radar video data and the detection gate data which are plotted on said graph and displayed on said graph for viewing by said user; and (d) a computer software program for controlling, handling and interpreting said radar video data points and said detection gate data being plotted on said graph, said computer software program transferring the radar video data points for said scan of radar video data and said detection gate data from a data worksheet to said graph and then plotting the radar video data points for said scan of radar video data and said detection gate data on said graph, wherein said computer software program, responsive to a selection by said user of the scan of radar video data to be plotted on said graph, plots the radar video data points for said scan of radar video data and said detection gate data on said graph.

2. The radar video data viewing system of claim 1 wherein said plurality of text box controls include a first frame text box and a first scan text box which allow the user to set and display the scan of radar video data plotted on said graph by entering a frame number in said first frame text box and a scan number in said first scan text box.

3. The radar video data viewing system of claim 2 wherein said plurality of text box controls include a scans grouped text box and a samples offset text box wherein said scans grouped text box allows the user to display and set the number of scans of radar video data displayed on said chart and said samples offset text box displays an offset count for a first sample of said radar video data points shown on said chart.

4. The radar video data viewing system of claim 1 wherein said plurality of controls buttons includes a pan left control button and a pan right control button, said pan left control button allowing the user to shift a view of the scan of radar video data to the left up to a first radar video data point of said scan of radar video data, and said pan right control button allowing the user to shift the view of the scan of radar video data to the right up to the last radar video data point of said scan of radar video data.

5. The radar video data viewing system of claim 1 wherein said plurality of controls buttons includes a zoom in control button and a zoom out control button, the zoom in control button magnifying the radar video data points being viewed by said user about the center of said graph to show a detailed view of said scan of radar video data and the zoom out control button expanding a view of the radar video data being displayed to show more of said scan of radar video data.

6. The radar video data viewing system of claim 1 further comprising a series collection name for each of said scans of radar video data plotted on said graph wherein said user accesses the series collection name for said scan of radar video data by placing a mouse pointer on said scan of radar video data, said series collection name including a frame count and a scan count for said scan of radar video data.

7. The radar video data viewing system of claim 1 wherein said plurality of control buttons includes a new data control button which allows the user to load a new data file containing a new series of radar scans of radar video data comprising approximately 2,048 radar scans onto said data worksheet.

8. The radar video data viewing system of claim 7 wherein said new series of radar scans of radar video data comprises approximately 2,048 radar scans.

9. A radar video data viewing system comprising:

(a) a monitor for viewing a plurality of scans of radar video data provided by a radar seeker for a missile, wherein each of said plurality of scans of radar video data appears on a graph displayed on said monitor, said graph including:

(i) a horizontal axis having a numerical range of approximately 0 to 4096, said horizontal axis representing a numerical range of radar video data points for each of said scans of radar video data being plotted on said graph;

(ii) a first vertical axis positioned on the left end of said graph, said first vertical axis indicating an amplitude for each of said scans of radar video data points being plotted on said graph;

(iii) a second vertical axis positioned on the right end of said graph, said second vertical axis indicating an amplitude for detection gate data appearing on said graph, said detection gate data comprising a detection gate window plotted on said graph which indicates a location for a target within said radar video data points as determined by the radar seeker for said missile, wherein each of said scans of radar video data has one detection gate window associated therewith to identify the location for said target within a plot of said scan of radar video data on said graph;

(b) a plurality of control buttons appearing on said monitor below said graph, said plurality of control buttons allowing a user to manipulate views of each of said scans of radar video data plotted on said graph and the detection gate window associated with each of said scans of radar video data;

(c) a plurality of text box controls appearing on said monitor below said graph, said plurality of text box controls allowing a user to select each of said scans of radar video data to be plotted on said graph and the detection gate data associated therewith, wherein said user selects a group number for a total number of said scans of radio video data for plotting on said graph and the detection gate window associated therewith; and (d) a computer software program for controlling, handling and interpreting said radar video data points and said detection gate data being plotted on said graph, said computer software program transferring the radar video data points for each of said scans of radar video data and said detection gate data associated with each of said scans of radar video data from a data worksheet to said graph and then plotting the radar video data points for each of said scans of radar video data and said detection gate data on said graph, wherein said computer software program, responsive to a selection by said user of each of the scans of radar video data to be plotted on said graph, plots the radar video data points for each of said scans of radar video data and said detection gate data associated therewith on said graph.

10. The radar video data viewing system of claim 9 wherein said plurality of text box controls include a first frame text box, a first scan text box and a scans grouped text box which allow the user to set and display the total number of said scans of radar video data to be plotted on said graph by entering a frame number in said first frame text box, a scan number in said first scan text box and said group number for the total number of said scans of radar video data to be plotted on said graph.

11. The radar video data viewing system of claim 10 wherein the group number said user enters into said scans grouped text box is within a range of one to thirty one which indicates the number of scans of radar video data to be plotted on said graph.

12. The radar video data viewing system of claim 9 wherein said plurality of controls buttons includes a pan left control button and a pan right control button, said pan left control button allowing the user to shift a view of the scans of radar video data to the left up to a first radar video data point for each of said scans of radar video data, and said pan right control button allowing the user to shift the view of the scans of radar video data to the right up to approximately the four thousand ninety sixth radar video data point for each of said scans of radar video data.

13. The radar video data viewing system of claim 9 wherein said plurality of controls buttons includes a zoom in control button and a zoom out control button, the zoom in control button magnifying the radar video data points being viewed by said user about the center of said graph to show a detailed view of said scans of radar video data and the zoom out control button expanding a view of the radar video data being displayed to show more of said scan of radar video data.

14. The radar video data viewing system of claim 9 wherein said plurality of control buttons includes a new data control button which allows the user to load a new data file containing a new series of radar scans of radar video data onto said data worksheet.

15. The radar video data viewing system of claim 14 wherein said new series of radar scans of radar video data comprises approximately 2,048 radar scans.

16. The radar video data viewing system of claim 9 wherein each of said scans of radar video data is displayed on said graph using one of a plurality colors wherein said plurality of colors include black, blue, green, cyan, red, magenta, brown and orange.

17. A method for plotting and simultaneously viewing a plurality of scans of radar video data on a monitor for a computer comprising the steps of:
 (a) down loading said plurality of scans of radar video data from a radar seeker within a missile to a data array within a memory of said computer, wherein each of said scans of radar video data has associated therewith detection gate data;
 (b) transferring said plurality of scans of radio video data onto a data worksheet from the data array within said memory in said computer, wherein said scans of radar video data being transferred from said data array to said data worksheet has a range of 1 to 2048;
 (c) displaying a graph on the monitor of said computer wherein said graph includes:
  (i) a horizontal axis having a numerical range of approximately 0 to 4096, said horizontal axis representing a numerical range of radar video data points for each of said scans of radar video data to be plotted on said graph;
  (ii) a first vertical axis positioned on the left end of said graph, said first vertical axis indicating an amplitude for each of said scans of radar video data points to be plotted on said graph;
  (iii) a second vertical axis positioned on the right end of said graph, said second vertical axis indicating an amplitude for detection gate data appearing on said graph, said detection gate data comprising a detection gate window to be plotted on said graph;
 (d) plotting a first scan of radar video data on said graph wherein said user selects said first scan of radar video data to be plotted on said graph from said plurality of scans of radar video data contained on said data worksheet by entering a frame number into a first frame text box and a scan number into a first scan text box, said first frame text box and first scan text box appearing below said graph on said monitor; and
 (e) plotting a detection gate window on said graph, said detection gate window comprising the detection gate data associated with said first scan of radar video data plotted on said graph, wherein said detection gate window for said first scan of radar video data indicates a location for a target within said first scan of radar video data as determined by the radar seeker for said missile.

18. The method of claim 17 further comprising the step of plotting additional scans of radar video data on said graph, wherein said user enters a scan group number into a scans grouped text box to determine the number of said additional scans of radar video data plotted on said graph.

19. The method of claim 18 further comprising the step of identifying each of said additional scans of radar video data plotted on said graph by utilizing colors to identify each of said additional scans of radar video data plotted on said graph plotted on aid graph wherein said colors include black, blue, green, cyan, red, magenta, brown and orange.

20. The method of claim 18 wherein said scan group number said user enters into a scans grouped text box ranges from 2 to 31 which indicates the number of said additional scans of radar video data plotted on said graph.

* * * * *